(12) United States Patent
Berardi

(10) Patent No.: US 8,291,942 B2
(45) Date of Patent: Oct. 23, 2012

(54) EXPANDABLE HOSE ASSEMBLY

(75) Inventor: Michael Berardi, Jupiter, FL (US)

(73) Assignee: Blue Gentian, LLC, Jupiter, FL (US)

( * ) Notice: Subject to any disclaimer, the term of this patent is extended or adjusted under 35 U.S.C. 154(b) by 0 days.

(21) Appl. No.: 13/488,515

(22) Filed: Jun. 5, 2012

(65) Prior Publication Data

US 2012/0234425 A1 Sep. 20, 2012

Related U.S. Application Data

(63) Continuation-in-part of application No. 13/289,447, filed on Nov. 4, 2011.

(51) Int. Cl.
*F16L 11/00* (2006.01)

(52) U.S. Cl. .......... 138/118; 138/119; 15/314; 239/195; 239/281

(58) Field of Classification Search .......... 138/118, 138/119, 46, 121; 239/195–198, 208, 281, 239/280.5; 15/314, 414, 321, 327.1–327.7
See application file for complete search history.

(56) References Cited

U.S. PATENT DOCUMENTS

| | | | |
|---|---|---|---|
| 31,614 A * | 3/1861 | Mayall | 138/126 |
| 2,814,529 A | 11/1957 | Arnt | |
| 2,922,667 A | 1/1960 | Lanciano | |
| 3,035,779 A | 5/1962 | Convis | |
| 3,205,913 A * | 9/1965 | Ehlers | 138/125 |
| 3,481,368 A | 12/1969 | Vansickle et al. | |
| 3,520,725 A | 7/1970 | Hamrick | |
| 3,524,779 A | 8/1970 | Masters et al. | |
| 3,682,202 A | 8/1972 | Buhrmann et al. | |
| 3,861,424 A | 1/1975 | Mizutani | |
| 3,886,029 A | 5/1975 | Poulsen | |
| 3,928,979 A * | 12/1975 | Terashima et al. | 405/50 |
| 3,966,121 A | 6/1976 | Littman | |
| 4,009,734 A | 3/1977 | Sullivan | |
| 4,081,302 A | 3/1978 | Drostholm et al. | |
| 4,091,063 A | 5/1978 | Logan | |
| 4,111,237 A | 9/1978 | Mutzner et al. | |
| 4,140,154 A | 2/1979 | Kanao | |
| 4,276,908 A | 7/1981 | Horne | |
| 4,308,896 A | 1/1982 | Davis | |
| 4,445,543 A | 5/1984 | Mead | |

(Continued)

FOREIGN PATENT DOCUMENTS

WO WO03010459 2/2003

*Primary Examiner* — Patrick F Brinson
(74) *Attorney, Agent, or Firm* — McHale & Slavin, P.A.

(57) ABSTRACT

A hose which automatically expands longitudinally and automatically expands laterally upon the application of a fluid pressure is disclosed. The hose can automatically expand longitudinally up to six times its unexpanded or contracted length. Upon release of the fluid pressure within the hose, the hose will automatically contract to a contracted condition. The hose includes an inner tube made from an elastic material and an outer tube made from a non-elastic material. The inner tube is positioned concentrically within the outer tube in both a contracted condition and an expanded condition. The outer tube is secured to the inner tube only at a first end of the inner and outer tubes and at a second end of the inner and outer tubes. The outer tube moves laterally and longitudinally with respect to the inner tube when the tubes are transitioning between a contracted condition and an expanded condition.

14 Claims, 6 Drawing Sheets

U.S. PATENT DOCUMENTS

| | | | |
|---|---|---|---|
| 4,478,661 A * | 10/1984 | Lewis | 156/92 |
| 4,553,568 A | 11/1985 | Piccoli et al. | |
| 4,657,049 A | 4/1987 | Fourty et al. | |
| 4,683,917 A | 8/1987 | Bartholomew | |
| 4,895,185 A | 1/1990 | Champleboux et al. | |
| 4,989,643 A | 2/1991 | Walton et al. | |
| 5,023,959 A | 6/1991 | Mercer | |
| 5,036,890 A | 8/1991 | Whaley | |
| 5,148,836 A | 9/1992 | Lawrence | |
| 5,246,254 A | 9/1993 | LoJacono, Jr. et al. | |
| 5,264,262 A | 11/1993 | Igarashi | |
| 5,477,888 A | 12/1995 | Mezzalira | |
| 5,538,513 A | 7/1996 | Okajima | |
| 5,555,915 A | 9/1996 | Kanao | |
| 5,607,107 A | 3/1997 | Grieve et al. | |
| 5,816,622 A | 10/1998 | Carter | |
| 5,894,866 A | 4/1999 | Horst et al. | |
| 5,918,642 A | 7/1999 | Akedo et al. | |
| 6,024,132 A | 2/2000 | Fujimoto | |
| 6,024,134 A | 2/2000 | Akedo et al. | |
| 6,065,944 A | 5/2000 | Cobb | |
| 6,098,666 A | 8/2000 | Wells et al. | |
| 6,103,971 A | 8/2000 | Sato et al. | |
| 6,192,940 B1 | 2/2001 | Koma et al. | |
| 6,209,800 B1 | 4/2001 | Thomas | |
| 6,305,428 B1 | 10/2001 | Nakamura et al. | |
| 6,446,661 B2 | 9/2002 | Armenia et al. | |
| 6,568,610 B1 | 5/2003 | Ericksen | |
| 6,698,457 B2 | 3/2004 | Hayashi et al. | |
| 6,948,527 B2 | 9/2005 | Ragner et al. | |
| 6,955,189 B1 * | 10/2005 | Weyker | 138/104 |
| 7,302,972 B1 | 12/2007 | Stowe | |
| 7,306,012 B2 * | 12/2007 | Stockton et al. | 138/119 |
| 7,549,448 B2 | 6/2009 | Ragner | |
| 7,640,620 B2 * | 1/2010 | Stockton | 15/301 |
| 7,735,523 B2 | 6/2010 | Smith et al. | |
| 2004/0194781 A1 | 10/2004 | Fukunaga et al. | |
| 2009/0301593 A1 | 12/2009 | Zucchi et al. | |

* cited by examiner

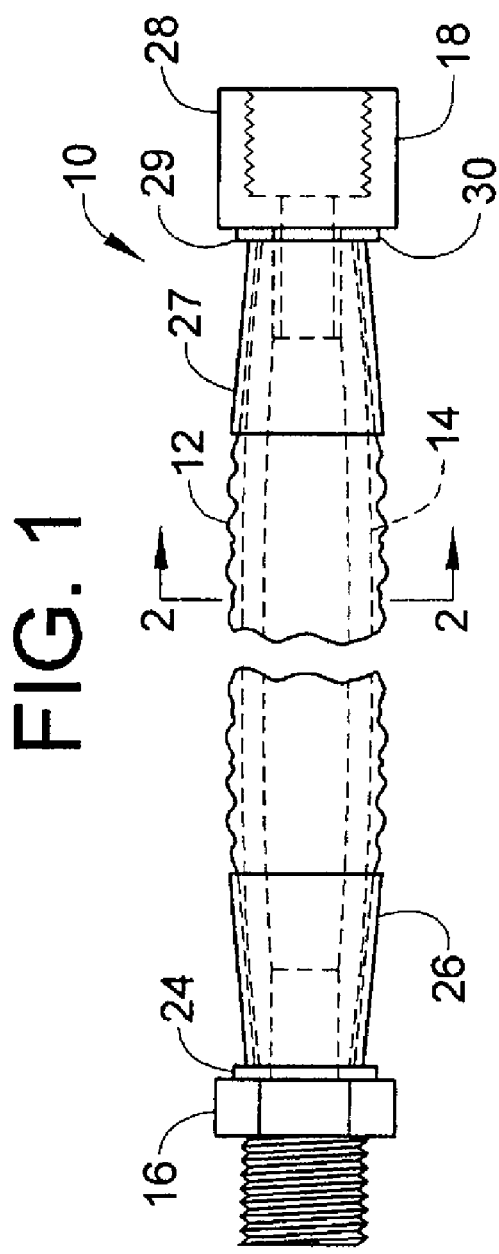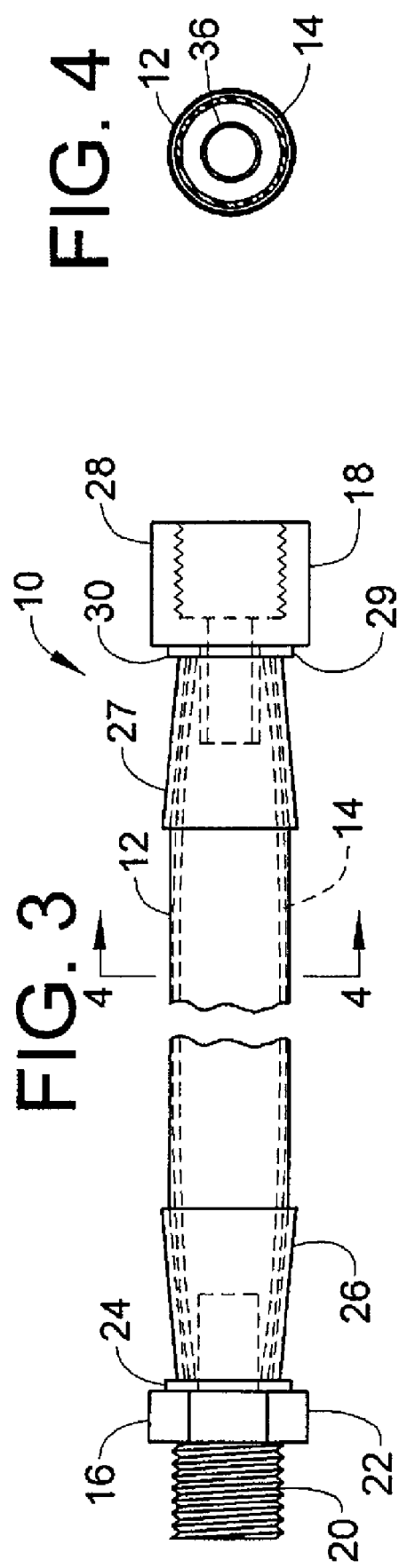

EXPANDABLE HOSE ASSEMBLY

RELATED APPLICATION

This is a Continuation-in-Part of U.S. patent application Ser. No. 13/289,447 entitled Expandable and Contractible Hose having a filing date of Nov. 4, 2011, the contents of which is incorporated herein by reference.

FIELD OF THE INVENTION

The present invention relates to the field of fluid carrying hoses and, in particular, to a hose that expands when a pressurized fluid is introduced.

BACKGROUND OF THE INVENTION

Hoses used to carry various fluids are well known in the art. Conventional garden hoses are typically constructed from rubber or other resilient flexible material such as synthetic rubber, thermo plastic rubber or the like photochemical derivatives. A notable problem encountered with conventional garden hoses relates to the storage of the hose when not in use. Garden hoses can be stored on a hose reel, placed within a storage container, or simply left on the ground. While storage devices are practical in certain situations, in many instances the consumer cannot use or has no desire to employ a storage container. For example, a consumer may live in an apartment or small condo and would like to have the benefit of a garden hose for plant watering, car washing, or the like but do not have room for a garden hose storage device. The hose might be left in the trunk of a vehicle or coiled up in the corner of a patio with an effort to consume as little space as possible. Another example would be the owner of a boat, RV or plane who may wish to leave the hose with the vehicle. Such places are impacting for hose storage containers.

There are many situations where it is beneficial to store a hose in as little a space as possible. If the consumer does not have a device for storing the hose then they must try to organize the hose on the ground in a way as to not entangle the hose within itself. If improperly organized, the hose will tend to kink when unwrapped or uncoiled. This problem is typically encountered by the average homeowner who uses the hose infrequently wherein improper storage of a hose can result in the development of kinks. Hoses can be made with thick sidewalls to prevent kinking and resist over pressurization. Fiber reinforcements can also be used, such as woven tapes or knitting followed by the addition of an outer coating, all of which add to the weight of a hose. For this reason, it is of great benefit to have a hose that is light in weight, contractable in length, and kink resistant.

Retractable hoses are known using steel wires formed in a coiled shape with a vinyl tube, the steel wires wind through the vinyl tube so that it will normally be in a coiled or rolled configuration when not in use. When pressurized water is introduced into the hose, the hose is unwound. When the pressurized water is removed, the hose is recoiled to a rolled position. Examples of such hoses include U.S. Pat. Nos. 2,814,529; 3,035,779 and U.S. Pat. No. 3,966,121.

U.S. Pat. No. 3,861,424 discloses a flexible hose formed from thin tubing and a spiral reinforcement. The tubing is tapered in its thickness in the longitudinal direction between adjacent spiral turns so that the tubing may bend inwardly in the form of pleats.

U.S. Pat. No. 4,140,154 discloses a flexible hose having a soft body with a rigid helical reinforcement embedded therein.

U.S. Pat. No. 4,009,734 discloses a flexible self-retracting tubing having desirable recoil strength and elastic memory. The coiled tubing is adaptable as a self-retracting air tube for transmitting fluids under pressure to pneumatic equipment.

U.S. Pat. No. 4,091,063 discloses a hose construction having axially spaced convolutions and a controlled flexibility defined by alternating crests and troughs, and the hose construction has an elastomeric inner layer, an elastomeric outer layer, and an intermediate reinforcing layer made of a fabric material having a substantial open space between cooperating threads defining the fabric material.

U.S. Pat. No. 4,553,568 discloses a flexible hose adapted to regain its original shape after crushing due to a braided-spiral reinforcement layer containing one braid member which is a relatively stiff, un-crimped monofilament and a second braid member which is a flexible textile material crimped around the stiff monofilament at each contact point in the braided spiral layer.

U.S. Pat. No. 4,895,185 discloses a flexible hose reinforced by armature layers made of flexible cables disposed helically and is attached at least at one end by compression of said layers against rigid pieces, characterized by the supporting elements and gripping elements, which are coaxial, having non-adhesive conical compression surfaces which diverge toward the end and by at least one wedge provided with slits being driven between reinforcing layers to ensure compression.

U.S. Pat. No. 5,023,959 discloses a system for extending and retracting the waste hose for a waste disposal system that is typically found on recreational vehicles and includes power or crank-driven hose extender means for extending a collapsible hose from its collapsed mode to its extended configuration which can be used for dumping waste from an RV holding tank into an inlet of an RV waste dump station.

U.S. Pat. No. 5,477,888 discloses a hose having at least one tubular layer of plastic or rubber material, a mesh-network of the chain type presenting mesh lines and mesh rows having a tubular shape being wound on the external surface of said inner layer, a possible external layer, and is characterized in that said mesh rows are slanted in relation to the longitudinal axis of the hose. According to a preferred embodiment the lines of said meshes are slanted in relation to the longituidinal axis Y of the hose, following a direction opposite to the direction of the mesh rows.

U.S. Pat. No. 5,555,915 discloses a vacuum cleaner hose includes a reinforcement wire material wound in the hose body spirally and continuously over the whole length of hose body. The reinforcement wire material is shaped like a steeply slanted spiral in a predetermined length portion near one of or both of the ends of the hose body so that adjacent spiral portions of the reinforcement wire material are close to each other while a hose wall of the hose body is loosened toward the inner circumferential surface.

U.S. Pat. No. 5,607,107 discloses a retractable conduit formed from a sheet of memory-set polyester. In one form, suitable as a splash block, the distal end of the polyester sheet is wider than the end attachable to a downspout. In another form the polyester sheet is sheathed in an elongated polyethylene tube, to form a retractable hose. In a preferred form, the distal end of the hose is supported on a spool which will roll along the ground as the hose is wound and unwound to further ensure that the hose retracts properly. The tube can also be provided with holes to act as a sprinkler if desired.

U.S. Pat. No. 5,894,866 discloses a garden hose assembly having a deformable section that allows a portion of the hose to be coiled around a support for holding the end of the hose in a desired position.

U.S. Pat. No. 6,209,800 discloses a flexible tube formed so that adjacent coils are formed while in a contracted position, the tube is extendible by straightening of the coils.

U.S. Pat. No. 6,568,610 discloses a flexible water spray wand for connection to a standard garden hose, having a housing connectable at a lower end to the garden hose and at an upper end to a flexible tube assembly connected at an opposite end to a spray nozzle.

U.S. Pat. Nos. 6,948,527 and 7,549,448 disclose a linearly self-actuated hose for use in transporting fluids. A hose has a biasing spring that extends along the full length, and can comprise single or multiple springs and/or multiple diameter spring coils. The spring is covered with hose cover material on the outside and hose cover material on the inside to form a sealed hose and are bowed inward or outward radially between the individual spring coils depending on the intended use of hose.

U.S. Pat. No. 6,955,189 discloses a garden hose assembly includes an elongated and flexible tubular member that includes an open first end, an open second end and a peripheral wall extending between the first and second open ends. A cross-section taken traversely to a longitudinal axis of the tubular member has a generally oblong shape when the tubular member is filled with a fluid and a substantially flattened shape when the tubular member is not filled with a fluid.

Therefore, what is needed in the art is a flexible hose for use in the transfer of fluids, such as water, that is contracted in length when not in use and will extendable in length when pressurized fluid is introduced, and automatically returned to the reduced length when not in use.

SUMMARY OF THE INVENTION

Disclosed is a hose constructed and arranged to expand upon the presence of pressurized fluid placed within the hose. The hose can expand longitudinally up to six times its length and width by use of a flexible inner tube positioned within an outer tube having a fixed construction. Upon release of the pressurized fluid from within the inner tube, the inner tube will contract. The outer tube is positioned around the outer circumference of the inner tube and secured to the inner tube only at the ends. The inner tube is preferably secured to the outer tube at the ends of the tube which is preferably the adapter to male and female water couplings, such as a water faucet at one end and an adjustable spray head at the opposite end.

Accordingly, it is an objective of the present invention to provide a flexible hose that expands longitudinally and laterally upon the application of a fluid pressure within the hose.

It is an additional objective of the present invention to provide a hose that lengthens 2.5 to 2.8 times its contracted length upon the application of a fluid pressure within the hose.

It is a further objective of the present invention to provide a hose that lengthens up to 6 times its contracted length upon the application of fluid pressure within the hose.

It is yet another objective of the present invention to provide a hose that is relatively light compared to a non-expanding hose, the hose of the instant invention have a thin wall inner tube that will expel fluid upon contraction.

It is a still further objective of the present invention to provide a hose that will not kink or become entangled upon itself when in use, the hose having a defined state during retraction that will reduce or eliminate kinks from forming.

It is a still further objective of the present invention to provide a hose that allows the placement of indicia, such as words, on an outer sleeve of the hose wherein the indicia can be displayed in an expanded state and obscured in a contracted state.

It is a still further objective of the present invention to provide a hose that can be readily coupled and uncoupled to a source of pressurized water such as a faucet on a residential or commercial property.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 1 is a longitudinal side view of the present invention in a contracted position;

FIG. 2 is a cross section view of the present invention taken along line 2-2 in FIG. 1;

FIG. 3 is a longitudinal view of the present invention in an expanded position;

FIG. 4 is a cross sectional view of the present invention taken along line 4-4 in FIG. 3;

DETAILED DESCRIPTION OF THE INVENTION

Figure 5:
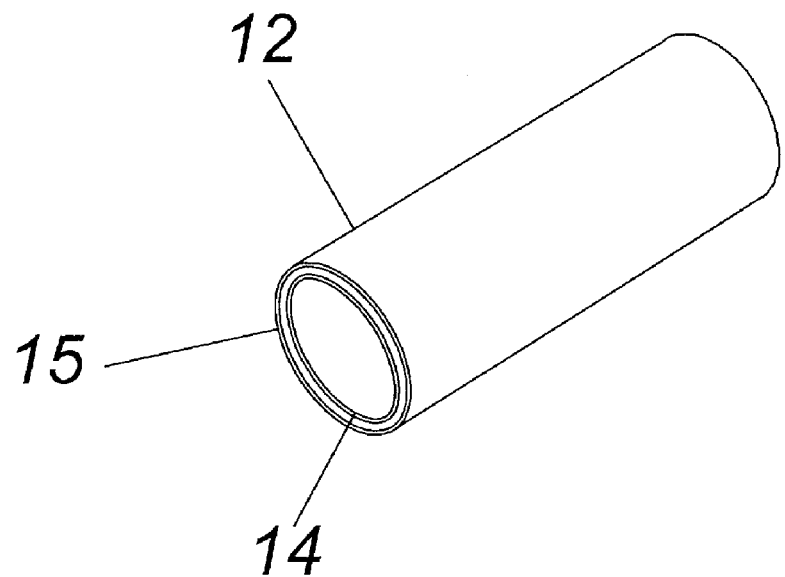
FIG. 5 is a cross sectional view, perspective view of a section of the hose of the present invention taken along line 4-4 in FIG. 3.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring in general to FIGS. 1-8 set forth is a preferred embodiment of the expandable hose of the present invention. The hose is self-expanding upon the introduction of a pressurized fluid within the hose, and self-contracting upon release of the fluid within the hose. The hose 10 is composed of two separate and distinct tubes. The inner tube 14 is formed from a material that is elastic with an elongation ratio of up to 6 to 1 and can expand up to 4 to 6 times its relaxed or unexpanded length when a pressurized fluid is introduced into the inner tube 14. In the preferred embodiment the length is expanded 2.5-2.8 times the contracted length and the inner tube 14 is natural latex rubber. However, other synthetic materials, which have elastic properties similar to rubber can also be used. The elastic inner tube 14 expands radially outwardly or laterally, with respect to its length. The radial expansion of the inner tube 14 is constrained by the maximum diameter of the non-elastic outer tube 12. The outer tube 12 is formed from a non-elastic, relatively soft, bendable, tubular webbing material. The preferred materials used to form the non-elastic outer tube 12 are braided or woven nylon, polyester, or polypropylene. Other braided or woven materials can also be employed to form the outer tube 12. The requirements of the outer tube 12 material are that it be soft, bendable, non-elastic, and should be strong enough to withstand internal pressures of up to 250 pounds per square inch, (psi).

The hose 10 employs a female coupler 18 at a first end and a male coupler 16 at a second end. The male coupler 16 includes a threaded portion 20, a mid-portion 22, and a portion 24 onto which are secured the inner tube 14, the outer tube 12 and an expansion restrictor sleeve 26. The inner tube 14, the outer tube 12, and the expansion restrictor sleeve 26 are secure to the male coupler as will be described herein after.

Figure 8:
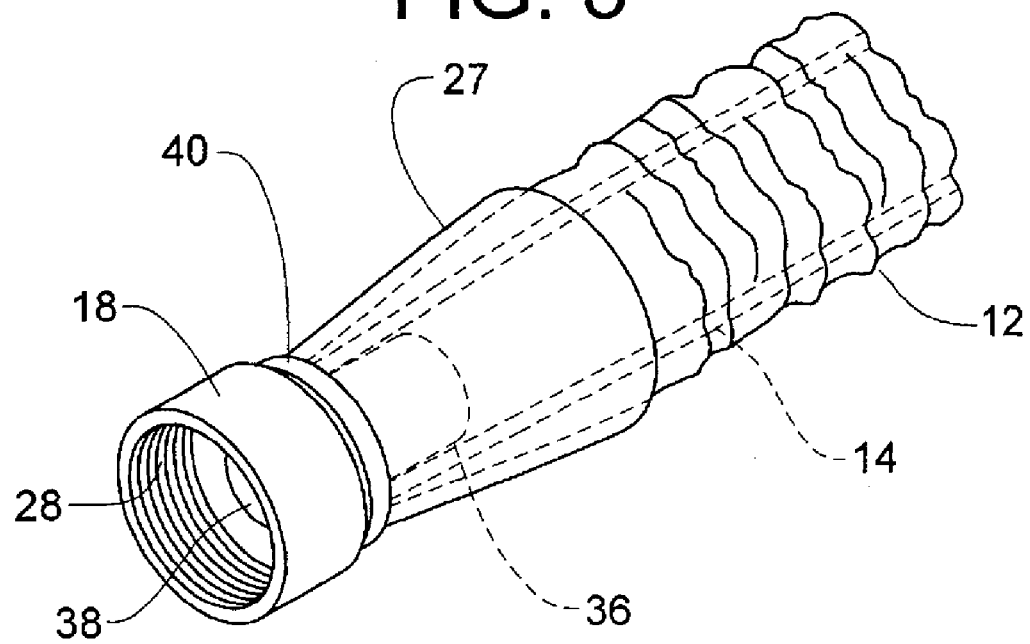
FIG. 8 is a perspective view of a female coupler secured to an end of the hose of the present invention when the hose is in its contracted condition.

The female coupler 18 includes a threaded portion 28 on the interior of the female coupler, see FIGS. 1, 3, and 8. The threaded portion 28 is constructed to receive the male threads 20 and enable coupling of one hose to another. The threaded portion 28 is also constructed to couple to a faucet, spigot or the like valve control typically found on the exterior of a residence or commercial property. Most water faucets on residences employ a standard size male coupler or fitting. Such couplers are known in the industry, most conventional garden hoses have a standard size female coupler or fitting which will engage such a faucet.

The inner tube 14, the outer tube 12, and the expansion restrictor sleeve 27 are secure to the female coupler as will be described herein after. In the preferred embodiment the female coupler also includes a washer 29 which assures a fluid tight connection between the male and female couplers or any other male or female coupler. During assembly, the non-elastic outer tube 12 is attached and connected to the inner tube 14 only at the first end and second end by the male coupler 16 and the female coupler 18, The outer tube 12 is preferably unattached, unconnected, unbonded, and unsecured to the elastic inner tube 14 along the entire length of the inner tube 14 between the first end and the second end and thus the outer tube 14 is able to move freely with respect to the inner tube along the entire length of the inner tube 14 when the hose expands or contracts.

Figure 6:
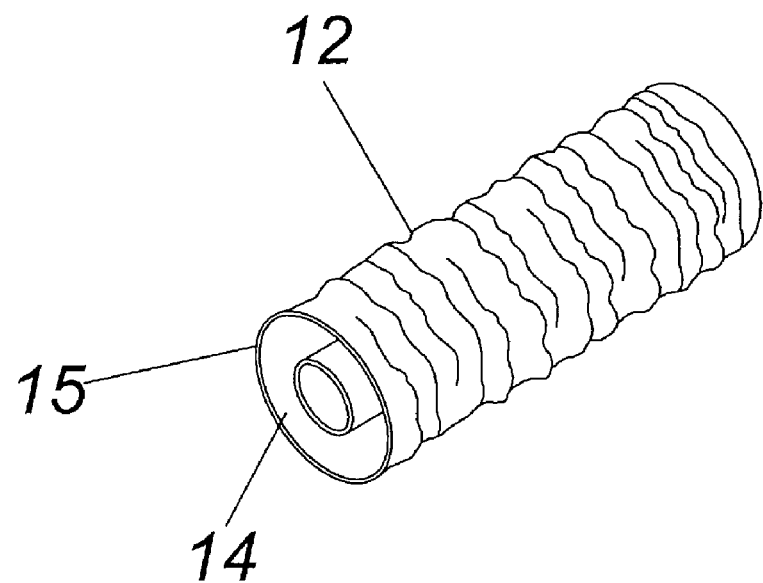
FIG. 6 is a cross sectional view, perspective view of a section of the hose of the present invention taken along line 2-2 in FIG. 1.

The hose 10 of the present invention is illustrated in its contracted condition in FIGS. 1, 2, 6, and 8. In this condition, the inner tube 14, which is elastic, is in a relaxed contracted condition wherein there are no forces being applied to the inner tube 14 to expand or stretch it. The amount of fluid that may reside in the tube in its contracted condition is much less than while in its expanded condition. Also it should be noted that the outer tube 12 is preferably not be in a bonded contact with the inner tube 14 when the hose is in this contracted condition. There will be a space 15 between the inner tube 14 and the outer tube 12 (FIG. 6). As illustrated in FIG. 6, the thickness of the wall of the inner tube 14, in the contracted position, is relatively large compared to the thickness of the inner tube 14, in the expanded position, FIG. 5. The expansion of the elastic inner tube 14 laterally, is the result of an increase in the pressure and volume of the fluid within the inner tube 14. This increase in fluid pressure and volume in the inner tube 14 also results in the expansion of the length of the elastic inner tube 14. The expansion of the inner tube 14, both laterally and longitudinally, results in a decrease in the wall thickness of the inner tube, an increase in the diameter of the inner tube thus increasing the volume of fluid that can flow through the inner tube 14. This decrease in wall thickness is clearly illustrated in FIG. 5, wherein the inside diameter of the inner tube has been expanded and extended because of an increase of the fluid pressure and volume within the inner tube 14.

In the expanded or extended condition, illustrated in FIGS. 3-5, the inner tube 14 is expanded or stretched. In this expanded condition the non-elastic outer tube 12 constrains the lateral expansion of inner tube 14. The outer tube 12 is also taunt, smooth, and relatively flat along its length in this extended condition, note FIGS. 3 and 5. Since the outer tube 12 will not expand laterally or longitudinally, the actual length and width of the outer tube 12 determines the maximum length and maximum width of the hose 10 in its expanded condition. Thus the diameter and length of the outer tube 12 determines the diameter and length of the hose of the present invention upon the application of fluid pressure to the interior of the elastic inner tube 14. This diameter and length of the non-elastic outer tube is the final diameter and the final length of the hose 10 when it is in its expanded condition and in use to transport or deliver a fluid.

In a preferred embodiment of the present invention the hose 10 automatically expands 4 to 6 times its contracted length upon the introduction of water into the tube that has a pressure of at least 20 psi. Thus, a ten foot hose in a contracted condition would automatically expand to 40 to 60 feet when fluid under pressure is supplied to the interior of the inner tube 12 of the hose. The fluid pressure within the hose is accomplished by introducing fluid under pressure into one end of the hose and restricting the flow of the fluid out of the other end of the hose. For example, when the hose 10 of the present invention is utilized as a garden hose around a house, coupler 18 is secure to a faucet or water outlet on an exterior wall of the house. The faucet is turned on or opened so that water under pressure can now enter the hose 10. A relatively normal pressure for municipal water is 60 psi. However, the pressure of water within a hose can vary widely, depending on a number of circumstances. For example, the pressure of water supplied by a water utility. The pressure of water supplied by a pump and sustained by an air bladder, when water is supplied from a well, etc. A nozzle or other fluid distributor is secured to male coupler 16 at the opposite end of hose. The nozzle can be a conventional nozzle which varies the rate and spray pattern of water exiting from the nozzle. Many nozzles are L-shaped so as to be able to be comfortably gripped and used by an individual. These nozzles also have a pivoting on-off handle which operates an internal valve. This internal valve permits, limits, and stops the flow of water through the nozzle.

The nozzle provides various amounts of restriction of fluid at the end of the hose depending on how large the opening in the nozzle is. The smaller the opening in the nozzle, the more the nozzle restricts the release of fluid at the end of the hose, and the higher the pressure and fluid volume inside the hose. The larger the opening in the nozzle, the less the nozzle restricts the release of fluid at the end of the hose, and the lower the pressure and fluid volume inside the hose. The pressure coming from a typical house is approximately 60 psi. If the flow of fluid at the other end of the present invention was turned off and totally restricted, the psi inside the inner tube would be the same as the pressure coming from the house, 60 psi. At this high pressure, the inner tube 14 and the outer tube 12 in the present invention would expand to its maximum length of fifty feet. As the fluid at the end of the hose is released, the pressure becomes reduced inside the hose and the hose begins to contract. However, the present invention will remain fully expanded even when the pressure at the opposite end is reduced below the typical pressure of 60 psi coming from a house. In one example, the water pressure coming from the house was 60 psi and the water pressure exiting the nozzle at the other end of the hose was 35 psi. This 35 psi of pressure inside the elastic inner tube 14 was enough pressure to cause the inner tube 14 to expand laterally and longitudinally until its lateral and longitudinal expansion became constrained by the non-elastic outer tube 12 and expanded to the maximum length and width of the non-elastic outer tube 12. In a preferred embodiment, the hose 10 expands from ten feet in length in its contracted condition to fifty feet in length in its expanded condition.

Figure 7:
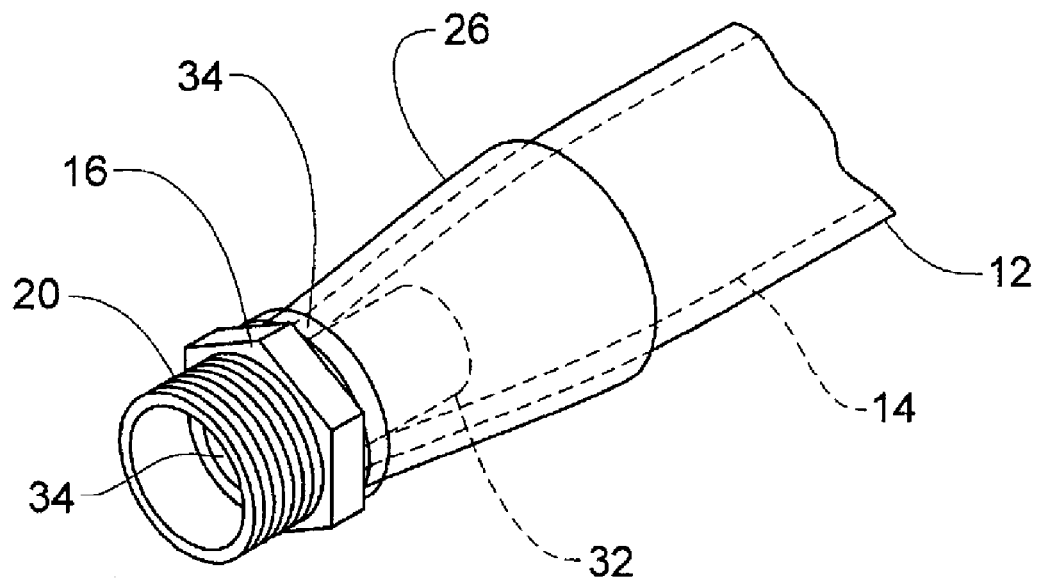
FIG. 7 is a perspective view of a male coupler secured to an end of the hose of the present invention when the hose is in its extended condition.

FIGS. 7 and 8 illustrate how male and female couplers 16 and 18 respectively are secured to the hose of a preferred embodiment of the present invention. In FIG. 7 the male coupler 16 includes a plurality of threads 20. The male coupler 16 also includes a tubular extension 32 which extends into the interiors of the inner tube 14, the outer tube 12 and the expansion restrictor sleeve 26. The tubular extension 32 has a hollow interior 34 through which fluids can flow. A securing device 34 encompasses the outer sleeve 26, the outer tube 12, and the inner tube 14 and secures these elements to the tubular extension 34. A separate flow restrictor 37 is illustrated within coupler 16. Other types of flow restrictors, such as hose nozzles, sprayers, etc. can also be employed. Anything that restricts the flow of the fluid within the hose can be employed. As can be seen in FIG. 7, the outer tube 12 is relatively smooth, the inner tube wall is relatively thin, compared to its thicker contracted condition and the expansion restrictor sleeve 26 is restricting the expansion of the inner and outer tubes at the junction of the securing device 34. Without the sleeve 26, the inner tube would immediately expand outwardly in a step function and probably rupture. The sleeve 26 permits the inner tube 14 to gradually expand and taper outwardly, thus preventing rupturing of the inner tube at this junction. Other types of connections, such as clamping and swaging can also be employed to secure the male coupler to the inner tube 14, the outer tube 14, and the sleeve 26. By using other types of connections, an expansion restrictor sleeve may not be needed.

Figure 11:
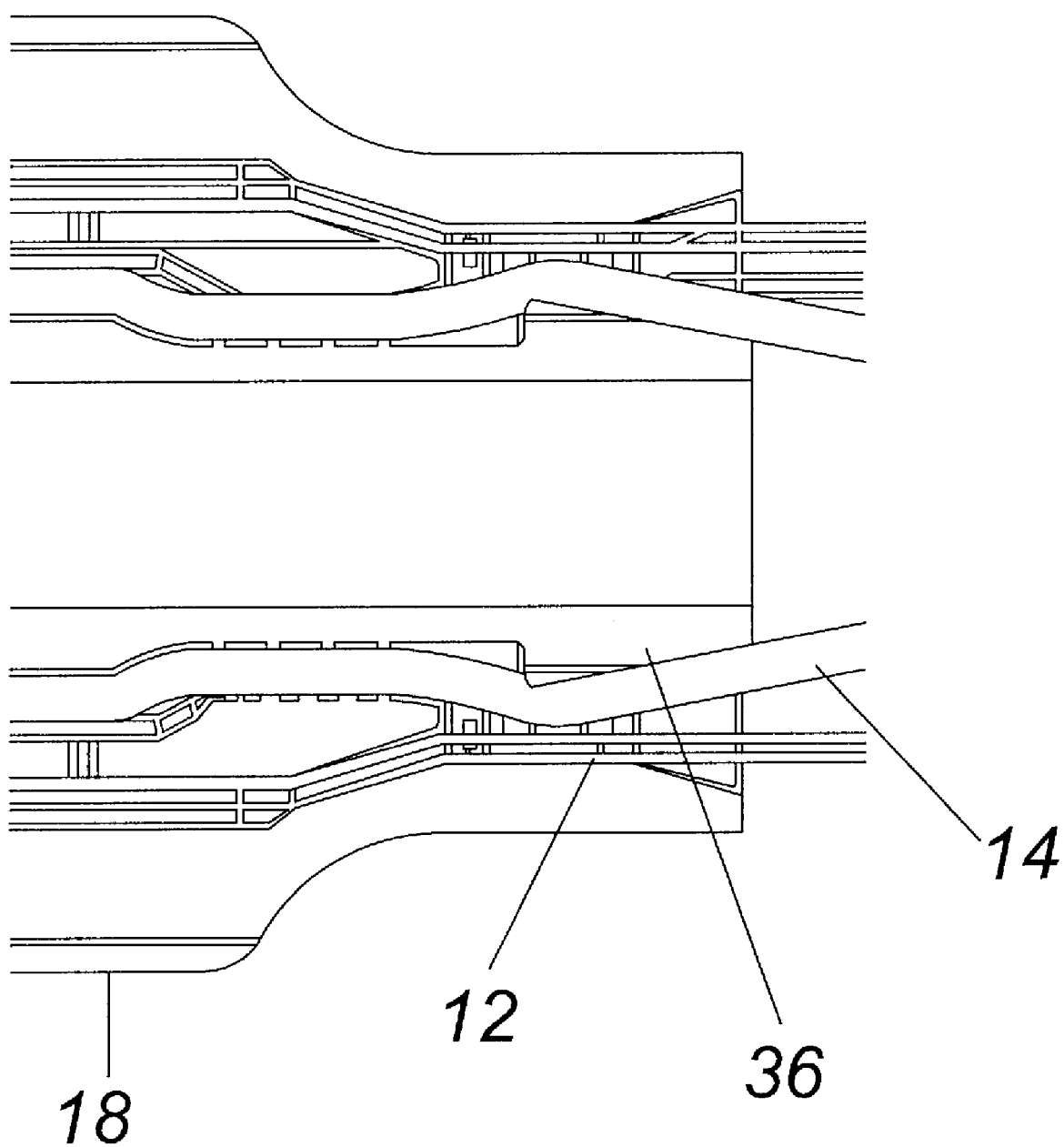
FIG. 11 is a cross section view of a coupling embodiment.
Figure 7:
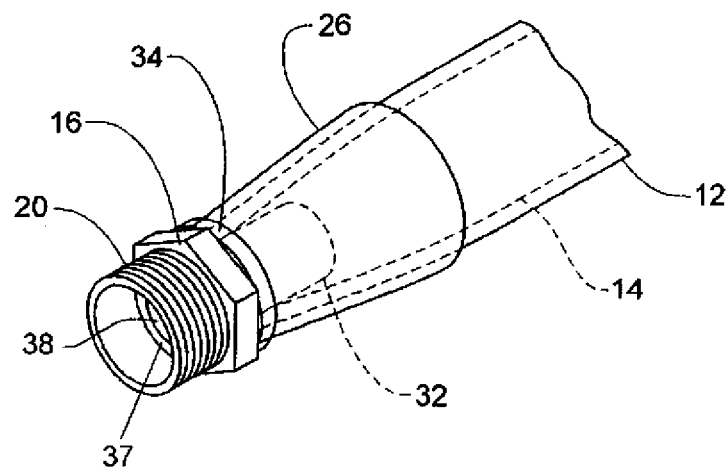
Figure 8:
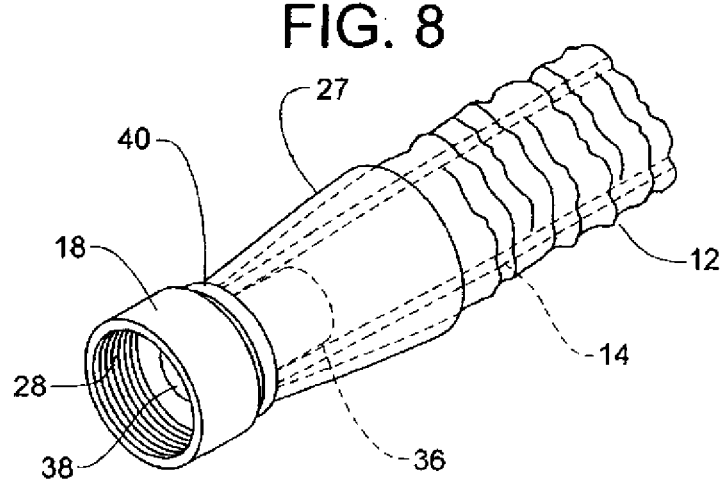

FIG. 8 illustrates the female coupler 18 secured to the hose of the present invention in a contracted condition. The female coupler 18 is provided with a plurality of internal threads 28. The threads 28 are designed to interact and cooperate with complementary threads 20 on a male coupler to provide a fluid tight connection between the male and female couplers 16 and 18. The female coupler 18 also includes a tubular extension 36 which extends into the interiors of the inner tube 14, the outer tube 12 and the expansion restrictor sleeve 27. The tubular extension 36 has a hollow interior 38 through which fluids can flow. A securing device 40 encompasses the outer sleeve 27, the outer tube 12, and the inner tube 14 and secures these elements to the tubular extension 36. As can be seen in FIG. 8, the soft fabric outer tube 12 is not smooth, but folded, compressed and tightly gathered around the circumference of the inner tube 14, the inner tube 14 wall is relatively thick, compared to its extended condition and the sleeve 27 is not restricting expansion of the inner and outer tubes at the junction of the securing device 40. Without the sleeve 27, the inner tube 14 would immediately expand outwardly in a step function and probably rupture upon the application of fluid pressure to the interior of hose 10. The sleeve 27 permits the inner tube 14 to gradually expand and taper outwardly, thus preventing rupturing of the inner tube at this junction. Other types of connections, such as clamping and swaging can also be employed to secure the female coupler to the inner tube 14, the outer tube 12, and the sleeve 27. By using other types of connections, such as that disclosed in FIG. 11, may eliminate the need for a restrictor sleeve.

Another feature of the present invention is the savings in weight of the hose. The hose 10 in its contracted condition is relatively light and after it is expanded 4 to 6 times, the weight of the hose does not increase. Also, because the hose does not contain any metal components such as springs, wire mesh or other metal parts along the entire length of the hose between the male connector and the female connector a ten foot contracted hose may only weigh less than 2 pounds and in the expanded condition, (not counting the weight of the fluid inside the expanded hose) the fifty foot hose would also only weigh less than 2 pounds. In contrast however, a conventional rubber ½ inch ID 50 foot hose could weigh up to 12 pounds. This savings in weight enables the hose of the present invention to be easily carried, easily dragged, easily handled and easily used by anyone who uses the hose but especially by individuals who do not posses exceptional strength or do not want to drag, carry or lug around heavy, bulky, conventional rubber hoses.

Another feature of the present invention is that the outer tube 12 is reduced or decreased in length when there is no pressure within inner tube 14. With no pressure or volume in the elastic inner tube 12 the inner tube automatically contracts. The condition of the outer tube 12 when the inner tube 14 is in the contracted condition is illustrated in FIGS. 1, 2 and 6. Because the outer tube is unsecured to the inner tube along the entire length of the hose between the first end and the second end, the soft fabric material of the outer tube 12 can move freely with respect to the inner tube. The fact that the outer tube can move freely with respect to the inner along the entire length of the hose enables the outer tube to become folded, compressed and tightly gathered around the outside of the circumference of the inner tube along its length in the contracted condition when there is not fluid pressure within the inner tube 14. This folded, compressed and tightly gathered condition of the outer tube 12 prevents the hose 10 from kinking and also helps prevent it from becoming entangled upon itself. Thus, an empty hose 10 in the contracted condition is easily stored without worry of the hose kinking or becoming entangled, as most conventional hoses do. This tendency of the hose 10 to not become kinked or entangled enables a user to store the hose 10 in a very small space with no worry of having to untangle or unkink the hose when it is removed from storage and used. A user of the present invention can take hose 10 from a stored condition, secure a nozzle or other fluid restrictor on one end of the hose, secure the hose 10 to a water faucet and turn on the water without the fear of the hose becoming entangled or kinked or without the need to untangle or unkink the hose.

After they are used conventional garden hoses are normally carried or dragged back to their place of storage and they are stored on a reel or coiled up upon themselves and laid on a flat surface. This requires time to carry and drag the hose and to properly store the hose and also requires an expense to purchase the hose reel. The hose 10 of the present invention automatically and quickly contracts to its original place of storage and can then be easily folded up, rolled up, or coiled up and stored in any container, even very small containers, or on any surface, thus saving time and expense for the owner of the hose.

FIGS. 5 and 6 illustrate a preferred embodiment of the present invention. During the assembly of the hose in the preferred embodiment a ten foot elastic inner tube 14 in its relaxed or contracted condition is inserted into the hollow interior of a 50 foot non-elastic outer tube 12. The ten foot inner tube 14 and the 50 foot outer tube 12 and the expansion restrictor sleeve 27 are then all attached and secured together on a coupler at the first end. The ten foot inner tube is then stretched or expanded through the hollow interior of the outer tube 12 until the elastic inner tube 12 is expanded to 5 times its relaxed or contracted length, At this point in the assembly process the expanded elastic inner tube 12 and the non-elastic outer tube 14 are both clamped down and the inner tube 12 and the outer tube 14 are both 50 feet long. The inner tube 12, and the outer tube 14 and the expansion restrictor sleeve 27 are then attached and secured together to the coupler at the second end while the hose is still in the expanded condition. As previously stated, the elastic inner tube 14 and the non-elastic outer tube 14 are only attached and secured together at the first end and the second end. The inner tube 12 and the outer tube 14 are unsecured along the entire length of the hose between the first end and the second end. This allows the non-elastic outer tube to move freely with respect to the inner tube along the entire length of the hose between the first end and the second end.

When the clamp is removed at the second end from the expanded 50 foot elastic inner tube 14 and the 50 foot non-elastic outer tube 12, the expanded elastic inner tube 14 automatically contracts within itself back to its original relaxed length of ten feet. The length of the 50 foot non-elastic outer tube 12 is also reduced to only ten feet in the contracted condition because when the stretched and extended elastic inner tube 12 begins to contract from its expanded length, the unattached, unbonded, unconnected and unsecured soft fabric non-elastic outer tube 12 catches on the rubbery elastic inner tube 14 material causing the outer tube 12 to automatically become folded, compressed and tightly gathered around the outside circumference of the entire length of the contracted inner tube 14. Thus, because the 50 foot non-elastic outer tube has many folds that are compressed and tightly gathered around the 10 foot contracted and relaxed inner tube 14, the folded, compressed and tightly gathered 50 foot outer tube 12 measures the same 10 foot length as the 10 foot contracted inner tube 12.

When a pressurized fluid is introduced into the elastic inner tube 12 in the contracted and relaxed condition, the elastic inner tube begins to expand laterally and longitudinally and the outer tube begins to unfold and uncompress around the circumference of the elastic inner tube. Consequently, when the inner tube expands to its maximum length of for example 50 feet, the outer tube unfolds, and uncompresses along the entire length of the inner tube until it reaches the same 50 foot length as the inner tube in the expanded condition. Also, because the inner tube expands both longitudinally and laterally and its expansion is constrained by the non-elastic outer tube 12, the inner tube 14 fills all of the available space inside the non-elastic outer tube 12 and thus the surface of the unfolded, uncompressed outer tube 12 becomes smooth in the expanded condition as depicted in FIG. 5.

The hose in FIG. 5 is in its expanded condition after a fluid under pressure has been introduced into the hose and the pressure and volume of the fluid has increased inside the inner tube 14. The expanded length of the hose 10 is now 50 feet, 600 inches, or 15.24 meters. The volume of fluid within the hose 10 is 0.943 gallons, 120 ounces, 3.569 liters, or 3180.64 cubic centimeters. The outer circumference of the hose 10 is 2.12 inches or 5.39 centimeters. The diameter of the outer tube 12 is 0.68 inches or 1.73 centimeters. The diameter of the inner tube 14 is 0.64 inches or 1.63 centimeters. The thickness of the wall of the inner tube 14 is 0.031 inches or 0.079 centimeters. The thickness of the outer tube 12 is 0.031 inches or 0.079 centimeters. The thickness of the outer tube 12 remains the same in both the expanded and contracted conditions. The material from which the inner tube 14 is formed can be any color. The hose in FIG. 6 is in its contracted condition and its dimensions are as follows. The length of the hose is 10 feet, 3.33 yards, or 3.05 meters. The volume of fluid within the hose 10 is 0.025 gallons, 3.2 ounces, 0.094 liters, or 94.635 cubic centimeters. The outer circumference of the hose 10 is 2 inches or 5.08 centimeters. The diameter of the outer tube 12 is 0.4 inches or 1.02 centimeters. The inside diameter (ID) of the inner tube 14 is, 0.25 inches or 0.635 centimeters. The outside diameter (OD) of the inner tube is 0.375. The thickness of the wall of the inner tube 14 is 0.125 inches or 0.317 centimeters. The thickness of the outer tube 12 is 0.031 inches or 0.079 centimeters.

Figure 9:
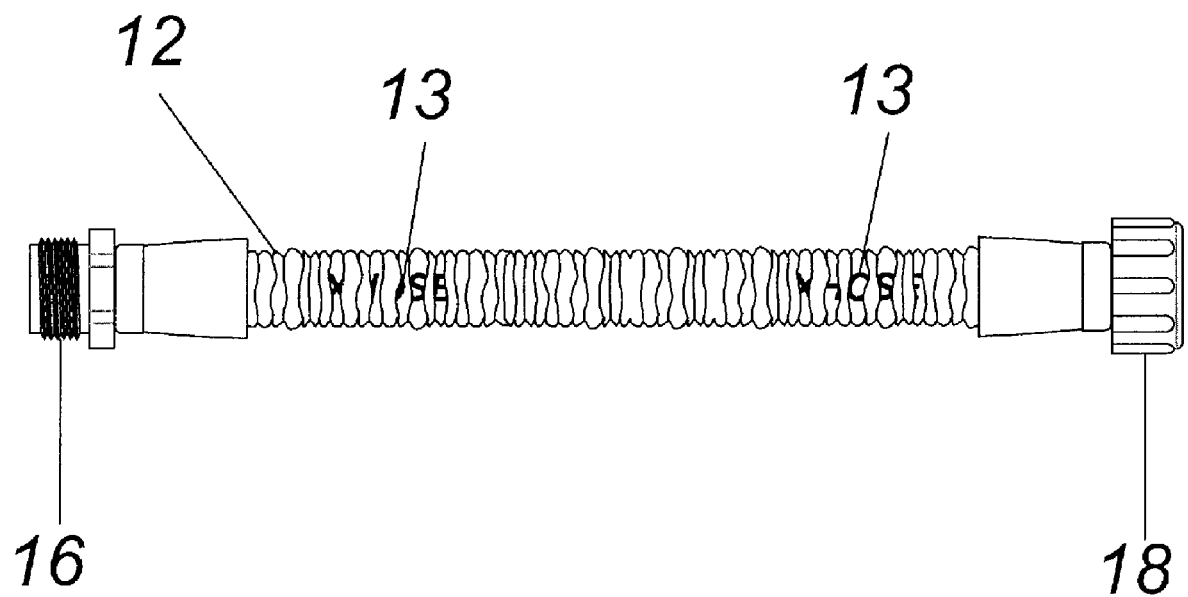
FIG. 9 is a pictorial view of the hose in a contracted state concealing indicia place on the outer sidewall.
Figure 10:
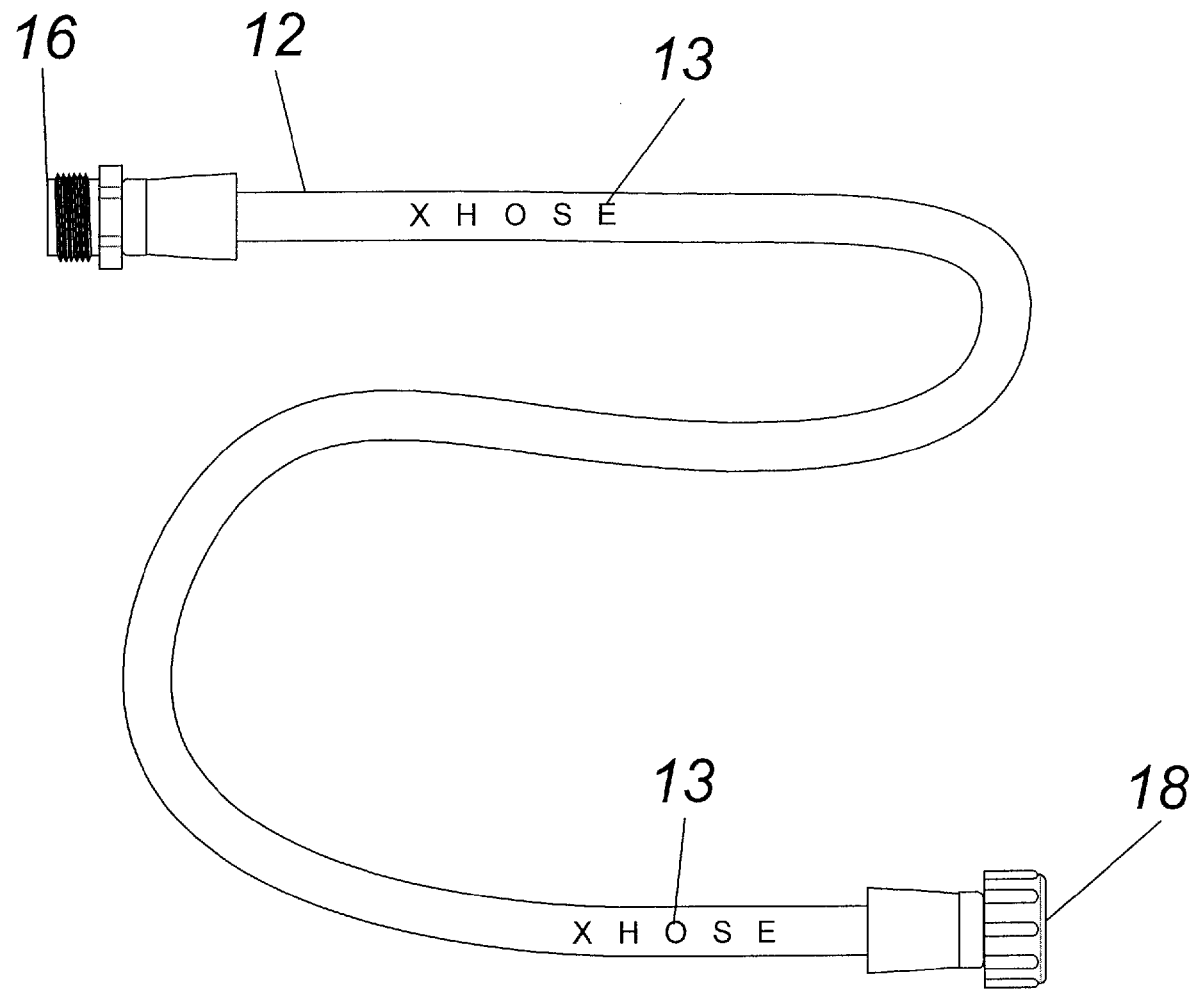
FIG. 10 is a pictorial view of the hose of FIG. 9 in an expanded state wherein indicia can be view on the outer wall.

The outer tube 12 is relatively smooth in the expanded condition, as seen in FIGS. 3 and 5. This smooth surface enables the hose 10 to be used and manipulated with relative ease. In addition, the expanded elastic inner tube 14 and the smooth surface of the outer tube 12 prevents the hose from kinking. Also the smooth surface enables indicia to be placed on the outer surface. Indicia placed on the outer tube can be concealed while the tube is in a contracted state, and become readable upon expansion. An example of this indicia is illustrated in FIGS. 9 and 10, wherein the words "XHose™" is placed on the exterior tube 12, when the hose is in a contracted state such as FIG. 9 the indicia 13 cannot be read. When the hose is in an expanded state such as FIG. 10 the indicia can be easily read. All types of indicia can be placed on the exterior of the outer tube 12, such as letters, numbers, patterns, designs, and/or pictures. Any type of indicia that can be affixed to the outer tube 12 can be used. The indicia can be any color also including black or white. The material from which the outer tube 12 is formed can also be any color.

The preferred embodiment of the present invention utilizes water to fill and expand the hose 10. However, other fluids can also be employed with the present invention. For example gases can be introduced into and transported through the hose 10. Liquids, which are capable with the inner tube 14 can be introduced including flowable semisolids. Because the inner tube is elastic it can expand if the water within the tube freezes. For example, if a garden hose of the present invention were left outside in the winter, the water contained therein would freeze causing an expansion. A conventional garden hoses would split due to the internal expansion, the flexible hose of the present invention would expand because the inner tube is elastic without damage.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A hose assembly comprising: an outer tube assembly formed from a soft non-elastic based control material housing an inner tube member constructed from an elastic based material, said outer tube assembly and said inner tube member each having a first end attached together by a first coupler and a second end attached together with a second coupler, said outer tube assembly is unattached from said inner tube member between said first and said second coupler; whereby said outer tube assembly and said inner tube member have a substantially shortened first length in a non-fluid flow contracted state with said outer tube assembly extending about an outer surface of said inner member in a undulating state and a substantially longer second length with said outer tube assembly capturing said inner tube member in an expanded state upon the application of fluid pressure to the interior of the elastic inner tube.

2. The hose assembly according to claim 1 wherein said outer tube assembly has a first end and a second end defining a first length therebetween in a contracted state and a second length therebetween in an expanded state, and said inner tube member positioned in said outer tube assembly wherein said first end operates as an inlet and second end operates as an outlet, said inner tube forming a watertight fluid flow path between said inlet and said outlet.

3. The hose assembly according to claim 1 wherein said first coupler is further defined as a female hose connector attached to said inlet of said inner tube member and said first end of said outer tube assembly, said female hose connector available for fluidly coupling said hose assembly to a source of pressurized fluid.

4. The hose assembly according to claim 1 wherein said second coupler is a male hose connector attached to said outlet of said inner tube member and said second end of said outer tube assembly, said male hose connector available for attachment to a fluid flow restrictor.

5. The hose assembly of claim 1 wherein said control material includes a circumferential control and a longitudinal control, wherein said control material will not extend beyond said second length fluid when flows through said hose assembly.

6. The hose assembly of claim 5 wherein said control material is material selected from the group consisting of nylon, polyester, or polypropylene.

7. The hose assembly of claim 5 wherein said control material is woven, braided or twisted to allow a substantially inelastic length and circumference.

8. The hose assembly of claim 1 wherein said inner tube includes an elongation ratio of up to six to one allowing said inner tube to expand up to six times a contracted first length.

9. The hose assembly claim 1 including an expansion restrictor sleeve secured to each coupler, said expansion restrictor sleeve providing a gradual transition of the laterally outward expansion of said inner tube member when there is a fluid flow between said inlet and said outlet.

10. The hose assembly of claim 1 including indicia positioned on said control material wherein indicia is readable while said assembly is in a contracted state.

11. The hose assembly of claim 1 including indicia positioned on said control material wherein said indicia is readable while said assembly is in an expanded state.

12. The hose assembly of claim 1 including indicia positioned on said control material where said indicia is readable while said assembly is in said expanded state and said contracted state.

13. The hose assembly of claim 1 wherein a fluid flow restrictor is placed within said male coupling whereby attaching said hose assembly in a contracted state to a pressurized fluid allows fluid to flow through said inlet to said outlet, said fluid flow restrictor creating an increase in fluid pressure causing an expansion of said inner tube member thereby extending said outer tube to said expanded state as allowed by said control material.

14. The hose assembly of claim 2 wherein said inlet and said outlet is reversed.

* * * * *

UNITED STATES PATENT AND TRADEMARK OFFICE
CERTIFICATE OF CORRECTION

| | |
|---|---|
| PATENT NO. | : 8,291,942 B2 |
| APPLICATION NO. | : 13/488515 |
| DATED | : October 23, 2012 |
| INVENTOR(S) | : Michael Berardi |

It is certified that error appears in the above-identified patent and that said Letters Patent is hereby corrected as shown below:

In the drawings:

In FIG. 2,   change reference numeral "36" to -- 38 --
In FIG. 4,   change reference numeral "36" to -- 38 --
In FIG. 7,   referring to the hollow interior, change reference numeral "34" to -- 38 --

In the specification:

COLUMN 5, LINE 44, change "14" to -- 12 --
COLUMN 6, LINE 28, change "12" to -- 14 --
COLUMN 7, LINE 20, change "34" to -- 38 --
COLUMN 7, LINE 23, change "34" to -- 32 --
COLUMN 7, LINE 38, change "14" to -- 12 --
COLUMN 8, LINE 24, change "12" to -- 14 --
COLUMN 9, LINE 4, after "inner tube", change "12" to -- 14 --
COLUMN 9, LINE 6, change "12" to -- 14 --
COLUMN 9, LINE 7, change "14" to -- 12 --; and change "12" to -- 14 --
COLUMN 9, LINE 8, change "14" to -- 12 --; and change "12" to -- 14 --
COLUMN 9, LINE 9, change "14" to -- 12 --
COLUMN 9, LINE 13, change "14" to -- 12 --
COLUMN 9, LINE 14, change "12" to -- 14 --
COLUMN 9, LINE 15, change "14" to -- 12 --
COLUMN 9, LINE 27, change "12" to -- 14 --
COLUMN 9, LINE 38, change "12" to -- 14 --
COLUMN 9, LINE 40, change "12" to -- 14 --

Signed and Sealed this
Fourth Day of February, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,291,942 B2 |
| APPLICATION NO. | : 13/488515 |
| DATED | : October 23, 2012 |
| INVENTOR(S) | : Michael Berardi |

It is certified that error appears in the above-identified patent and that said Letters Patent is hereby corrected as shown below:

In the drawings:

In Fig. 7, the reference numeral -- 37 and its lead line -- should be applied to the insert that can be seen inside the male coupler 16, which encompasses the hollow interior 38 as attached.

Signed and Sealed this
Fifteenth Day of April, 2014

Michelle K. Lee
*Deputy Director of the United States Patent and Trademark Office*